(12) United States Patent
Madsen

(10) Patent No.: US 6,602,000 B1
(45) Date of Patent: Aug. 5, 2003

(54) RECONFIGURABLE ADD/DROP FOR OPTICAL FIBER COMMUNICATION SYSTEMS

(75) Inventor: Christi Kay Madsen, South Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/288,202

(22) Filed: Apr. 8, 1999

Related U.S. Application Data

(60) Provisional application No. 60/120,770, filed on Feb. 19, 1999.

(51) Int. Cl.[7] ............................................. H04J 14/02
(52) U.S. Cl. ............................... 398/84; 398/85; 385/37
(58) Field of Search ................................ 359/130, 118, 359/119, 124, 127, 128, 129, 131; 385/16, 37, 31

(56) References Cited

U.S. PATENT DOCUMENTS

| | | | | |
|---|---|---|---|---|
| 5,136,671 A | * | 8/1992 | Dragone | 385/17 |
| 5,557,442 A | * | 9/1996 | Huber | 359/124 |
| 5,832,154 A | * | 11/1998 | Uetsuka et al. | 385/37 |
| 6,278,536 B1 | * | 8/2001 | Kai et al. | 359/110 |
| 6,348,984 B1 | * | 2/2002 | Mizrahi | 359/124 |

* cited by examiner

Primary Examiner—Leslie Pascal
Assistant Examiner—Christina Y Leung

(57) ABSTRACT

In accordance with the invention, an N channel WDM system is provided with add/drop capability by distributing the N channels among M paths where N<M, filtering each of the M paths through P add/drop filters where M×P=N, and recombining the M filtered paths for transmission. This can be implemented with an M×1 demultiplexer, tunable Bragg grating filters and a 1×M multiplexer.

5 Claims, 2 Drawing Sheets

RECONFIGURABLE ADD/DROP FOR OPTICAL FIBER COMMUNICATION SYSTEMS

CROSS REFERENCE TO RELATED APPLICATIONS

This application claims the benefit of U.S. Provisional Application Ser. No. 60/120,770 filed by the present inventor on Feb. 19, 1999 and entitled "Integrated Reconfigurable Add/Drop Using Tunable Filters."

FIELD OF THE INVENTION

This invention relates to optical fiber communication systems and, in particular, to reconfigurable add/drop devices for adding or dropping communication channels at intermediate points within such systems.

BACKGROUND OF THE INVENTION

Optical fiber communication systems are beginning to achieve their great potential for the rapid transmission of vast amounts of information. In essence, an optical fiber system comprises a light source, a modulator for impressing information on the light, an optical fiber transmission line for carrying the optical signals and a receiver for detecting the signals and demodulating the information they carry. Increasingly the optical signals are wavelength division multiplexed signals (WDM signals) comprising a plurality of distinct wavelength signal channels.

Add/drop devices are important components of WDM fiber communication systems. Such devices are typically disposed at various intermediate points along the transmission fiber (called nodes) to permit adding or dropping of signal channels at the nodes. Thus, for illustration, an add/drop device would permit a transmission line from New York to Los Angeles to drop off at Chicago signal channels intended for Chicago and to add at Chicago signal channels intended for New York and Los Angeles. As the number of nodes increases, the number of add/drop devices increases, and their cost and effect on the system becomes appreciable.

A straightforward approach to adding or dropping channels in a system carrying a number of channels (say N) in a single fiber is to first separate the fiber transmission signal into its N component signal channels, to redirect the N channels to desired paths—some of which continue on the main transmission path and some of which are dropped. The channels which are to be continued and those that are to be added are then recombined into a single transmission signal and transmitted to the next node.

This approach is conventionally implemented by a 1×N demultiplexer followed by a switch array and then an N×1 multiplexer. The demultiplexer receives the transmission signal and separates it into its N component signal channels. The switch appropriately directs each of the N channels, and the multiplexer combines the continued and added channels for transmission.

The difficulty with this conventional approach is that it is needlessly expensive and deleterious to the quality of the transmitted signals. The demultiplexer/multiplexer pair becomes expensive as the total number of channels (N) increases and the wavelength spacing between channels decreases. Numerous closely spaced channels require more and higher precision components. And the devices introduce loss in the signal channels in amounts which may vary from channel to channel.

Accordingly there is a need for an improved, add/drop device for optical fiber communication systems.

SUMMARY OF THE INVENTION

In accordance with the invention, an N channel WDM system is provided with add/drop capability by distributing the N channels among M paths where N>M, filtering each of the M paths through P add/drop filters where M×P=N, and recombining the M filtered paths for transmission. This can be implemented with an M×1 demultiplexer, tunable Bragg grating filters and a 1×M multiplexer.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
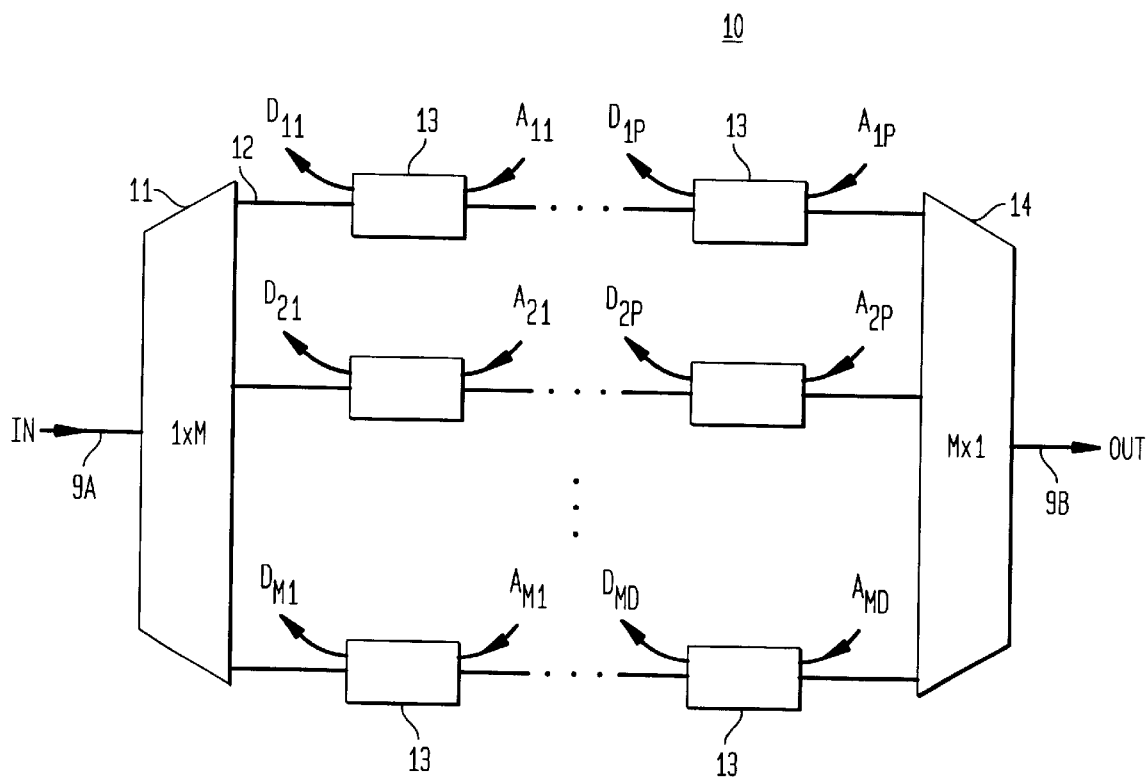
FIG. 1 is a schematic diagram of a first embodiment of an add/drop device in accordance with the invention.

Referring to the drawings, FIG. 1 illustrates an add/drop device 10 for an N channel WDM optical fiber communication system. The device 10 comprises a 1×M demultiplexer 11 for receiving an N channel WDM signal as from transmission fiber 9A and distributing the N channels among M paths 12 where M and N are integers and M<N. Also, M divides N (i.e. N/M=P where P is an integer). Each of the paths 12 includes P add/drop filters 13, each filter able to add one channel $A_{ij}$ and drop one channel $D_{ij}$. The filtered paths are recombined in a M×1 multiplexer 14 for further transmission in the next segment of transmission fiber, e.g. 9B. In this embodiment, the add/drop filters 13 separate the drop from the input.

In an advantageous embodiment, the demultiplexer 11 is a periodic response demultiplexer such as described in C. Madsen, "A Multiport Band Selector with Inherently Low Loss, Flat Passbands and Low Crosstalk, " IEEE Photon. Technol. Lett., vol. 10, no. 12, pp. 1766–1768, 1998. If we denote successive paths 12 by a subscript $_j$, the periodic response demultiplexer distributes the N channels among the paths $12_i$ as follows:

| Path | Channels |
| --- | --- |
| $12_1$ | 1, M + 1, 2M + 1, . . . , (P − 1)M + 1 |
| $12_2$ | 2, M + 2, 2M + 2, . . . , (P − 1)M + 2 |
| . . . | . . . |
| $12_m$ | M, 2M, 3M, . . . (P − 1)M + M |

The demultiplexer has a square passband response and is made using all-pass filters, so that low loss and passband flatness are preserved.

Figure 2A:
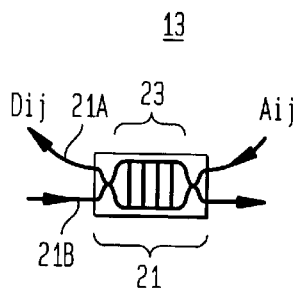
FIGS. 2A and 2B illustrate add/drop filters suitable for use in the device of FIG. 1.

FIG. 2A illustrates a suitable add/drop filter 13 for this application comprising a Mach-Zehnder interferometer 21 including a pair of arms 22A and 22B with a common Bragg grating 23 formed on both arms. The Bragg reflects a dropped channel to the upper input terminal $D_{ij}$ and permits addition of a channel of the same wavelength at output terminal $A_{ij}$. Such add/drop filters are described, in detail in T. Erdogan, T. Strasser, M. Milbrodt, E. Laskowski, C. Henry, and G. Kohnke, "Integrated-Optical Mach-Zehnder Add-Drop Filter Fabricated by a Single UV-Induced Grating Exposure." Optical Fiber Conference. San Jose, Calif., February, 1996; D. Johnson, K. Hill, F. Bilodeau, and S. Faucher, "New Design Concept for a Narrowband Wavelength-Selective Optical Tap and Combiner," Electronics Lett., vol. 23, no. 13, pp. 668–669, 1987; and R. Kashyap, G. Maxwell, and B. Ainslie, "Laser-Trimmed Four-Port Bandpass Filter Fabricated in Single-Mode Photosensitive Ge-Doped Planar Waveguide, " IEEE Photonics Technol. Lett., vol. 5, no. 2, pp. 191–194, 1993.

Since the wavelength spacing in each arm 12 is M times the channel spacing, relatively broad filters can be used. Specifically, the desired filtration can be achieved by relatively short Bragg gratings having relatively strong index changes. Due to the large effective channel spacing in each path, out-of-band reflection problems are minimized.

Figure 2B:
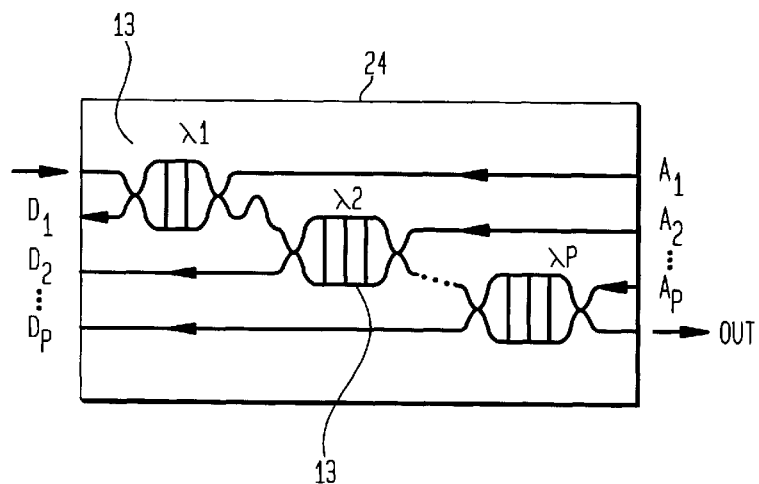

FIG. 2B shows how a plurality of P add/drop filters 13 can be cascaded on a common substrate 24 reducing lossy waveguide crossovers. Each of the P filters add/drop for a different signal channel $\lambda_1, \lambda_2, \ldots, \lambda_P$.

Ideally the filters 13 are tunable so that their responses can be moved out of the channel passband. This can be effected by thermal or strain tuning the Bragg gratings (21 or 25). The larger effective channel spacing in each arm gives a much larger range for the filter response to be moved without affecting other channels.

Figure 3:
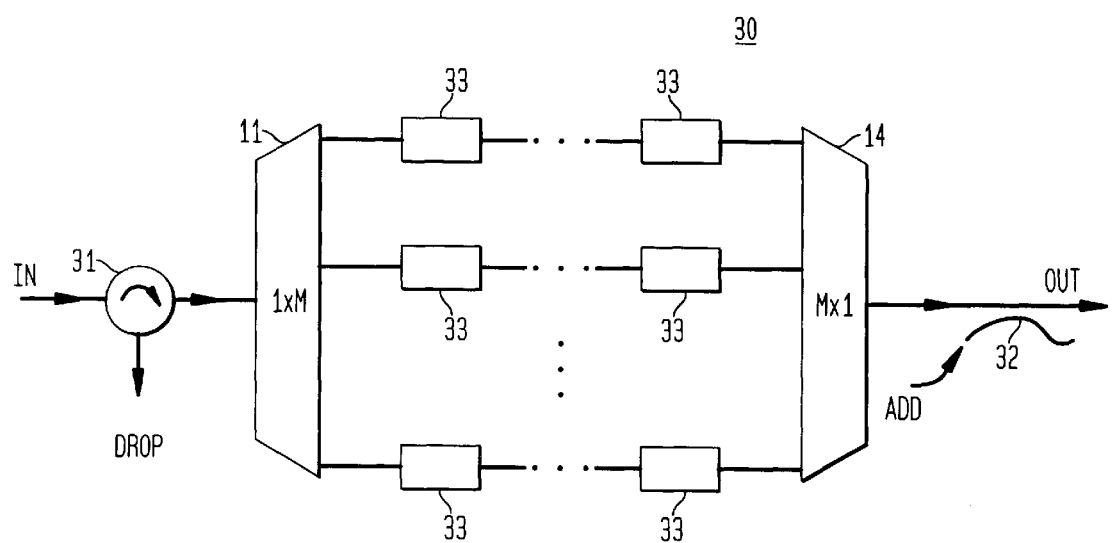
FIG. 3 is an alternative embodiment of an add/drop device.

FIG. 3 schematically illustrates an alternative embodiment of an add/drop device 30 wherein the drop can be reflected. Here the P filters 33 in each arm are simply tunable reflective Bragg gratings. The reflected dropped channels are taken out from an input circulator 31 and channels can be added by a passive coupler 32 at the output. Alternatively, coupler 32 can be replaced by a circulator to reduce the loss in the add operation.

The P add/drop filters in each of the M paths of FIG. 1 and FIG. 3 may alternatively be composed of a demultiplexer, tunable add/drop filters and multiplexer. For example, the device of FIG. 3 with a 1×P demultiplexer and a P×1 multiplexer may be used to replace the P individual add/drop filters in one of the paths of FIG. 1.

In either embodiment (FIG. 1 or FIG. 3), if the number and position of channels that can be dropped are restricted, then one tunable grating can be used to tune between two channels (separated by M channel spacings). This reduces the number of gratings needed for dropping.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed is:

1. A reconfigurable add/drop device for a wavelength division multiplexed optical communication system transmitting a signal comprising a plurality of N different wavelength channels, said device comprising:

a 1×M demultiplexer, where M is an integer less than N, for dividing the signal among M paths;

disposed in each of the M paths, a series of a plurality P of add/drop filters, each of the add/drop filters comprising a Mach-Zehnder interferometer of two arms having a Bragg grating on each arm; and a M×1 multiplexer for recombining the M paths.

2. The device of claim 1 wherein P=N/M.

3. The device of claim 1 wherein the demultiplexer is a periodic response demultiplexer.

4. The device of claim 1 wherein a series of add/drop filters includes a tunable add/drop filter.

5. The device of claim 1 wherein a series of add/drop filters comprises a plurality of Mach-Zehnder add/drop filters with Bragg gratings formed on a common substrate.

* * * * *